United States Patent Office 3,311,664
Patented Mar. 28, 1967

3,311,664
HEXAKIS THIOETHERS
Walter Reifschneider, Midland, Mich., assignor to The Dow Chemical Company, Midland, Mich., a corporation of Delaware
No Drawing. Filed Mar. 3, 1964, Ser. No. 349,179
6 Claims. (Cl. 260—609)

This application is a continuation-in-part of application Ser. No. 205,497, filed June 27, 1962, now abandoned.

The present invention is directed to thioethers and in particular is directed to novel thioethers corresponding to the formula

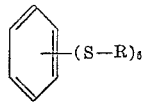

In the present specification and claims, R represents a member of the group consisting of (phenyl-thio)phenyl and halophenyl whereof the halogen is selected from fluorine, chlorine, and bromine; and ((mono-, di-, or poly(mono-, di- or polyfluorophenylthio)phenylthio) phenyl).

The novel compounds are yellow to dark crystalline solids, very slightly soluble to insoluble in water but soluble in various common organic solvents such as lower alkylketones, benzene and the like. The compounds are useful as insecticides and herbicides. The compounds are also useful as additives to reduce the temperature dependent viscosity properties of lubricating oils especially designed for operation under high pressures and temperatures; they are useful as intermediates in the preparation of dyestuffs and biologically active materials; they are also of value as solvent additives in the modification of behavior of mixed solvent systems.

The compounds are prepared by a process which comprises the steps of causing a reaction between an aromatic halide compound corresponding to the formula

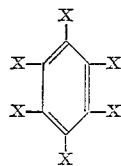

wherein X represents halogen selected from chlorine, bromine, and iodine, and a benzenethiol compound corresponding to the formula

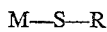

M—S—R wherein M is selected from hydrogen, alkali metal, and cuprous copper and R has the meaning previously set forth.

During the reaction to prepare the present compounds, 6 molecules of benzenethiol compound react with each molecule of aromatic halide. Small amounts of benzenethiol compound may be lost in side reactions. Thus, when it is desired to prepare the present compound in a high state of purity and with a minimum of necessary postsynthesis purification procedure, the starting reactants should be employed in the proportion of 6 moles of benzenethiol per mole of aromatic halide, or preferably, with the benzenethiol in slight excess. However, other proportions may be employed if desired, and unconsumed starting material of whatever identity may, if desired, be recycled into further synthesis process.

The reaction goes forward at temperatures over a wide range, such as from 50° to 400° C., but initiates most readily when heated to a temperature somewhat higher than room temperature; a preferred temperature range is 150 to 250° C. Under these conditions the reaction is, in general, exothermic and goes forward to completion with good yield calculated upon the basis of consumed starting material. Halide of reaction, of the formula MX is evolved and means for its orderly disposal are advantageously provided.

Typically, in the preparation of the compounds of the present invention, reaction between the thiol starting material and the aromatic halide starting material will initiate and go forward only when there is employed a catalytic amount of both a source of cuprous ion and a nitrogenous base. The employment of such catalyst appears to be essential and critical, although the exact weight employed is not critical. Certainly, the employment of such catalyst is in all cases highly advantageous. The source of cuprous ion may be metallic copper, in which case the copper reacts in some way to obtain cuprous halide. Also, cuprous oxide may be employed as a source of cuprous ion in which case water of reaction is evolved and cuprous halide results. Copper component of a cuprous benzenethiolate reactant is a satisfactory catalytic agent. Cuprous chloride itself or other cuprous salt may be employed. The employed amount is not critical, but may vary from a very small trace amount, less than $\frac{1}{100}$ of 1 molar percent, to as much as an amount equimolecular with either reactant or event greater. In general, the employment of larger amounts is accompanied by no major advantage and, being expensive, is not preferred.

The nitrogenous base can be ammonia, a primary, secondary, or tertiary aliphatic or aromatic amine or a nitrogenous heterocycle wherein the nitrogen acts, or is capable of acting as a basic substance. If desired, the nitrogenous base can be a naturally liquid substance which is employed as a reaction medium. Otherwise, such base is dissolved in inert liquid reaction medium such as a hydrocarbon oil.

It is preferred, at least on a laboratory scale, to employ the nitrogenous base catalyst substance in sufficient excess that portions of it may act also as hydrogen halide acceptor and yet further portions may continue to function, unreacted, in the necessary catalytic manner.

In carrying out the reaction to prepare the compounds of the present invention, the aromatic halide and the thiol are intimately mixed and blended, in any order and in desired amounts, with source of cuprous ion and nitrogenous base as hereinbefore described, and thereafter heated, to a temperature at which reaction takes place promptly. In one convenient method of practicing the present method, the reaction temperature may be the reflux temperature of the liquid reaction medium. In this situation, heating may be continued at the boiling temperature of the reaction mixture and under reflux for a period of time to carry the reaction to completion.

Upon completion of the reaction, the desired compounds of the present invention are separated in manners which, in view of the teaching of the instant specification, will be evident to skilled chemists. In one such manner, the reaction mixture, hot from heating to the reaction temperature, is poured into a mixture of ice and concentrated hydrochloric acid whereupon a precipitate forms from which the desired product can be extracted as a solvent-soluble fraction. Representative extraction solvents include diethyl ether, chlorinated hydrocarbons, and benzene. The said precipitate is extracted with solvent, the solvent extract dried over an inert drying agent such as, for example, anhydrous potassium carbonate or the like; the solvent vaporized and removed and the remaining product chilled or otherwise induced to crystalline and, if desired, recrystallized from a solvent such as a lower alkanol.

When production of the present compounds is to be carried out on an industrial scale, various other methods of separation and purification may be preferred, including, for example, centrifugation, decantation, vacuum distillation, and the like.

The following examples, without more, will enable those skilled in the art to practice the present invention.

*Example I.—Hexakis(p-chlorphenylthio)benzene*

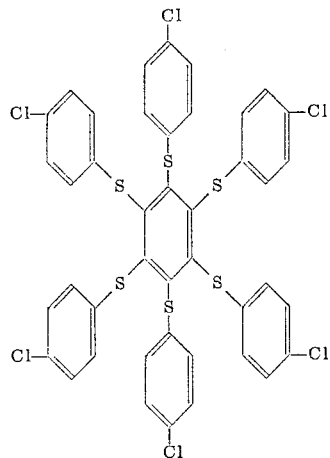

A reaction mixture is prepared consisting of 55 grams (0.1 mole) of hexabromobenzene melting at 321–324° C., 16 grams of cuprous oxide (technical grade) and 87 grams (approximately 0.6 mole) of p-chlorobenzenethiol dispersed in a mixture consisting of 110 milliliters quinoline and 10 milliliters pyridine. The resulting reaction mixture is placed in a flask under reflux, the reflux apparatus being equipped with a water trap. In this situation, the reaction mixture is heated at its reflux temperature (a pot temperature between approximately 200 and 240° C.) with stirring, for 6 hours to carry the reaction to completion. At the end of this reaction period, the resulting hot mixture is poured into a mixture of shaved ice and excess concentrated hydrochloric acid. As a result of these procedures, the ice melts and basic substances react with hydrochloric acid; in the resulting acidified water a precipitate forms. The precipitate is collected by filtration and extracted with ether, the ether extract liquid being saved. This liquid is dried over a bed of anhydrous potassium carbonate which also neutralizes remaining traces of acidic substances; the resulting liquid is warmed to vaporize and remove ether solvent and obtain a residual oil. This oil crystallizes upon standing; the crystals are taken up in hot ethanol and precipitated therefrom as the ethanol cools, to obtain a yellow, powdered, hexakis-(p-chlorophenylthio)benzene product. The product has a molecular weight of 933.8 and melts at 71–74° C.

The compound of the present example is useful as an insecticide and as an aquatic herbicide. The application of a water dispersion containing 0.5 gram of the said compound as sole toxicant per 100 milliliters of resulting aqueous dispersion to a population of Southern armyworm feeding on young bean plants resulted in the kill of a substantial proportion of the armyworm population.

In procedures essentially the same as the foregoing, by reacting hexaiodobenzene with 6 moles of m-chlorobenzenethiol, (boiling at 80–81° C. under 15 millimeters mercury pressure) there is obtained a hexakis-(m-chlorophenylthio)benzene product as a dark crystalline solid of low solubility in chloroform.

Also, by reacting hexachlorobenzene with 6 moles of o-fluorobenzenethiol there is obtained a hexakis(o-fluorophenylthio)benzene product.

Also, by reacting 6.3 moles m-bromobenzenethiol with 1 mole of hexaiodobenzene there is obtained a dark, difficulty soluble hexakis(m-bromophenylthio)benzene product.

*Example II.—Hexakis(p-(phenylthio)phenylthio)benzene*

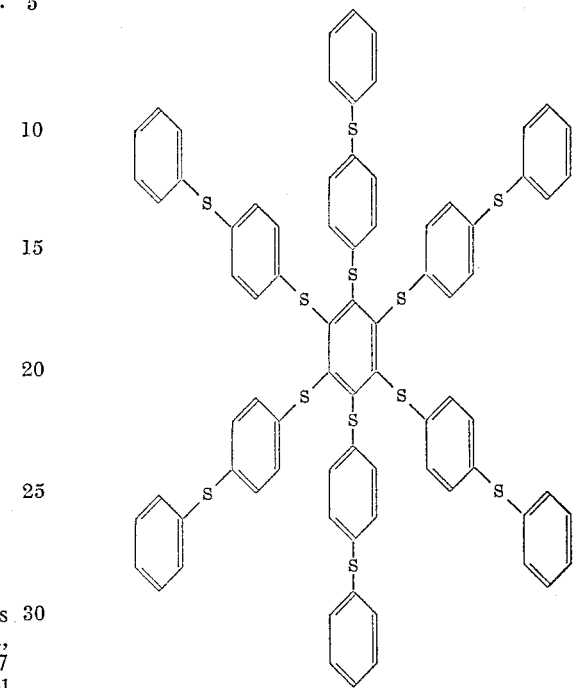

In procedures essentially similar to the foregoing except that the starting haloaromatic compound is the first product of Example I, and the thiol is benzene-thiol, there is prepared, in good yield, a dark-colored, hexakis(p-(phenylthio)phenylthio)benzene which is of moderate solubility in carbon disulfide but of low solubility in most solvents. The compound improves the lubricity of oils and greases to which it is added in amounts of from 0.5 to 10 weight percent. In similar procedures, from hexakis(m-chlorophenylthio)benzene and benzenethiol there is prepared a hexakis(m-(phenylthio)phenylthio)benzene; and from hexakis(o-chlorophenylthio)benzene and benzenethiol there is prepared a hexakis(o-(phenylthio)phenylthio)benzene product.

*Example III*

Essentially the procedures of Example II are carried out, but starting with hexakis(m-bromophenylthio)benzene as haloaromatic compound, reacting therewith 6 moles of 2,4-dichlorobenzenethiol to obtain a hexakis-(m-(2,4-dichlorophenylthio)phenylthio benzene intermediate compound. This intermediate is then reacted with 12.4 moles of p-fluorobenzenethiol to obtain a dark, apparently insoluble hexakis(m-(2,4-bis(p-fluorophenylthio)phenylthio)phenylthio)benzene compound of the formula

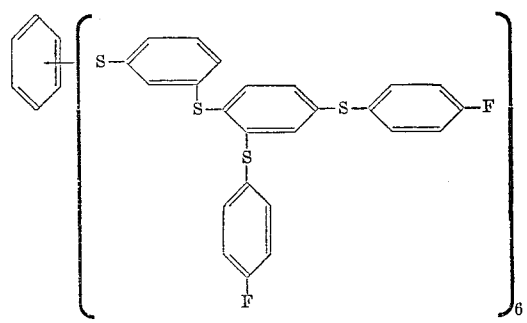

position isomers are similarly prepared.

I claim:
1. A compound corresponding to the formula

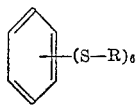

wherein R represents a member of the group consisting of (phenylthio)phenyl and monohalophenyl whereof halo is selected from fluoro, chloro, and bromo; and (((fluorophenylthio)phenylthio)phenyl).

2. Hexakis(p-chlorophenylthio)benzene.
3. Hexakis(p-(phenylthio)phenylthio)benzene.
4. Hexakis(m-chlorophenylthio)benzene.
5. Hexakis(o-fluorophenylthio)benzene.
6. Hexakis(m - (2,4 - bis(p - fluorophenylthio)phenylthio)phenylthio)benzene.

References Cited by the Examiner

Adams et al.: Croatica Chem. Acta, 29, 281 (1957).

CHARLES B. PARKER, *Primary Examiner.*
DELBERT R. PHILLIPS, *Assistant Examiner.*